US009246163B2

(12) United States Patent
Tanaami et al.

(10) Patent No.: US 9,246,163 B2
(45) Date of Patent: Jan. 26, 2016

(54) METAL OXYGEN BATTERY AND A METHOD FOR MANUFACTURING OXYGEN STORAGE MATERIAL USED THEREIN

(71) Applicant: HONDA MOTOR CO., LTD., Minato-ku, Tokyo (JP)

(72) Inventors: Kiyoshi Tanaami, Saitama (JP); Bunichi Saito, Saitama (JP); Takuya Taniuchi, Saitama (JP); Akihisa Tanaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/239,865

(22) PCT Filed: Aug. 30, 2013

(86) PCT No.: PCT/JP2013/073326
§ 371 (c)(1),
(2) Date: Feb. 20, 2014

(87) PCT Pub. No.: WO2014/045841
PCT Pub. Date: Mar. 27, 2014

(65) Prior Publication Data
US 2014/0295272 A1    Oct. 2, 2014

(30) Foreign Application Priority Data
Dec. 26, 2012    (JP) .................................. 2012-283192

(51) Int. Cl.
*H01M 4/131*    (2010.01)
*C01F 17/00*    (2006.01)
(Continued)

(52) U.S. Cl.
CPC ........... *H01M 4/131* (2013.01); *C01F 17/0043* (2013.01); *C04B 35/016* (2013.01);
(Continued)

(58) Field of Classification Search
CPC ...................................................... H01M 4/131
See application file for complete search history.

(56) References Cited

U.S. PATENT DOCUMENTS

2004/0202924 A1* 10/2004 Tao et al. ...................... 429/102
2007/0006578 A1    1/2007 Tanaami et al.
(Continued)

FOREIGN PATENT DOCUMENTS

JP    2006-175304 A    7/2006
JP    2007-14873 A    1/2007
(Continued)

OTHER PUBLICATIONS

Extended European Search Report dated Apr. 7, 2015, issued in the counterpart EP Patent Application 13828900.4.

*Primary Examiner* — Barbara Gilliam
*Assistant Examiner* — Stephan Essex
(74) *Attorney, Agent, or Firm* — Carrier Blackman & Associates, P.C.; Joseph P. Carrier; Anne G. Sabourin (57) ABSTRACT

Provided is a metal oxygen battery 1 including a positive electrode 2 having oxygen as an active material, a negative electrode 3 having metallic lithium as an active material, and an electrolyte layer 4 interposed between the positive electrode 2 and negative electrode 3. The positive electrode 2 contains oxygen storage material including mixed crystal of hexagonal composite metal oxide expressed by the general formula $A_xB_yO_z$ (in which, A is one type of metal selected from a group of Y, Sc, La, Sr, Ba, Zr, Au, Ag, Pt, Pd, B is one type of metal selected from a group of Mn, Ti, Ru, Zr, Ni, Cr, and x=1, $1 \leq y \leq 2$, $1 \leq z \leq 7$, provided that a case where both A and B are Zr is excluded) and one or more non-hexagonal composite metal oxide expressed by the general formula $A_xB_yO_z$.

5 Claims, 6 Drawing Sheets (51) Int. Cl.
*H01M 12/08* (2006.01)
*H01M 4/38* (2006.01)
*H01M 4/86* (2006.01)
*H01M 4/90* (2006.01)
*C04B 35/01* (2006.01)
*H01M 4/505* (2010.01)
*H01M 4/92* (2006.01)

(52) U.S. Cl.
CPC ........... *H01M 4/382* (2013.01); *H01M 4/8605* (2013.01); *H01M 4/8663* (2013.01); *H01M 4/9016* (2013.01); *H01M 12/08* (2013.01); *C04B 2235/3225* (2013.01); *C04B 2235/76* (2013.01); *C04B 2235/765* (2013.01); *C04B 2235/767* (2013.01); *H01M 4/505* (2013.01); *H01M 4/923* (2013.01); *Y02E 60/122* (2013.01); *Y02P 70/54* (2015.11)

(56) References Cited

U.S. PATENT DOCUMENTS

| | | | |
|---|---|---|---|
| 2008/0220334 A1* | 9/2008 | Inda | 429/322 |
| 2010/0317503 A1* | 12/2010 | Subramanian et al. | 501/42 |
| 2013/0011754 A1* | 1/2013 | Tanaami et al. | 429/406 |
| 2013/0164616 A1* | 6/2013 | Nakada et al. | 429/212 |
| 2013/0164638 A1 | 6/2013 | Tanaami et al. | |

FOREIGN PATENT DOCUMENTS

| | | | |
|---|---|---|---|
| JP | 2009-230985 A | | 10/2009 |
| JP | 2011-189306 A | | 9/2011 |
| JP | 2012-140312 A | | 7/2012 |
| JP | 2013-016385 A | | 1/2013 |
| JP | 5122021 B2 | | 1/2013 |
| WO | 2011/115176 A1 | | 9/2011 |
| WO | WO 2011115176 A1 | * | 9/2011 |
| WO | 2012/029743 A1 | | 3/2012 |

* cited by examiner

METAL OXYGEN BATTERY AND A METHOD FOR MANUFACTURING OXYGEN STORAGE MATERIAL USED THEREIN

BACKGROUND OF THE INVENTION

1. Field of the Invention

The present invention relates to a metal oxygen battery and a manufacturing method of an oxygen storage material used therein.

2. Description of the Related Art

Metal oxygen batteries have conventionally been known, which have a positive electrode using oxygen as an active material, a negative electrode using a metal as an active material, and an electrolyte layer interposed between the positive electrode and the negative electrode.

In the metal oxygen batteries, in the discharge time, a metal is oxidized to form metal ions at the negative electrode, and the formed metal ions permeate through the electrolyte and migrate into the positive electrode side. On the other hand, at the positive electrode, oxygen is reduced to form oxygen ions, and the formed oxygen ions bond with the metal ions to form a metal oxide.

In the charge time, at the positive electrode, metal ions and oxygen ions are formed from the metal oxide, and the formed oxygen ions are oxidized to become oxygen. On the other hand, the metal ions permeate through the electrolyte layer and migrate into the negative electrode side, and reduced to become the metal at the negative electrode.

In the metal oxygen battery, if metallic lithium is used as the metal, since the metallic lithium has a high theoretical potential and a large electrochemical equivalent weight, the metal oxygen battery can provide a large capacity. If oxygen in the air is used as the oxygen, since there is no need for filling a positive electrode active material in a battery, the energy density per mass of the battery can be raised.

However, if the positive electrode is exposed to the atmosphere in order to make oxygen in the air to be a positive electrode active material, moisture, carbon dioxide, and the like in the air invade in the battery, and there is caused a problem of deterioration of the electrolyte, the negative electrode, and the like. Then, in order to solve the problem, a metal oxygen battery is known, which has a positive electrode containing an oxygen-occluding material to release oxygen by reception of light, a negative electrode composed of metallic lithium, and an electrolyte layer disposed in a hermetically sealed case, and has a light transmission part to guide light to the oxygen-occluding material (for example, see Patent Document 1).

The metal oxygen battery can release oxygen from the oxygen-occluding material by guiding light to the oxygen-occluding material through the light transmission part, and can provide oxygen as a positive electrode active material without exposing the positive electrode to the atmosphere. Therefore, the deterioration of the electrolyte, the negative electrode, and the like due to the invasion of moisture, carbon dioxide, and the like in the air into the battery can be prevented.

However, in the conventional metal oxygen battery, the supply of oxygen becomes unstable in the absence of irradiation of light rays, and there is a risk that the light transmission part, which is weaker than other parts of the hermetically sealed case, is broken and the electrolyte solution leaks out. Then, it is conceivable that an oxygen storage material, which does not rely on irradiation of light rays and which can occlude and release oxygen chemically, or adsorb and desorb oxygen physically, is used as a positive electrode material of the metal oxygen battery. The oxygen storage material can be the one including hexagonal composite metal oxide expressed by a general formula $A_xB_yO_z$ (wherein A is one type of metal selected from a group consisting of Y, Sc, La, Sr, Ba, Zr, Au, Ag, Pt, Pd, and B is one type of metal selected from a group consisting of Mn, Ti, Ru, Zr, Ni, Cr, and $x=1$, $1 \leq y \leq 2$, $1 \leq z \leq 7$, provided that a case where both of A and B are Zr is excluded).

PRIOR ART

Patent Document

Patent Document 1: Japanese Patent Laid-open Publication No. 2009-230985

SUMMARY OF THE INVENTION

Problems to be Solved by the Invention

However, in a metal oxygen battery using an oxygen storage material including hexagonal composite metal oxide expressed by the general formula $A_xB_yO_z$ as the positive electrode material, the overvoltage becomes high, resulting in disadvantages that the discharge potential and discharge capacity decrease.

It is an object of the present invention to eliminate such disadvantages and provide a metal oxygen battery which uses an oxygen storage material including hexagonal composite metal oxide expressed by the general formula $A_xB_yO_z$ as the positive electrode material, and which can decrease the overvoltage.

Moreover, it is also an object of the present invention to provide a manufacturing method of the oxygen storage material used in the metal oxygen battery.

Means for Solving the Problem

The present inventors have studied causes of the charge overvoltage becoming high when an oxygen storage material including hexagonal composite metal oxide expressed by the general formula $A_xB_yO_z$ as the positive electrode material of a metal oxygen battery. As a result, it has been found that since the hexagonal composite metal oxide has the action as the oxygen storage material and the action as a catalyst, the action as the catalyst becomes insufficient, and the electrode reaction is hard to progress.

The present invention has been achieved based on such finding; and in order to achieve the above-mentioned object, in a metal oxygen battery comprising a positive electrode to which oxygen is applied as an active material, a negative electrode to which metallic lithium is applied as an active material, and an electrolyte layer interposed between the positive electrode and the negative electrode, the positive electrode contains an oxygen storage material including a mixed crystal of a hexagonal composite metal oxide expressed by a general formula $A_xB_yO_z$ (wherein A is one type of metal selected from a group consisting of Y, Sc, La, Sr, Ba, Zr, Au, Ag, Pt, Pd, and B is one type of metal selected from a group consisting of Mn, Ti, Ru, Zr, Ni, Cr, and $x=1$, $1 \leq y \leq 2$, $1 \leq z \leq 7$, provided that a case where both A and B are Zr is excluded) and one or more non-hexagonal composite metal oxide expressed by the general formula $A_xB_yO_z$.

In the metal oxygen battery according to the present invention, in the discharge, metallic lithium is oxidized to form lithium ions and electrons at the negative electrode as shown in the following formula, and the formed lithium ions permeate through the electrolyte layer and migrate into the positive electrode. On the other hand, at the positive electrode, oxygen released or desorbed from the oxygen storage material is reduced to form oxygen ions, and the formed oxygen ions react with the lithium ions to form lithium oxide or lithium peroxide. Then, by connecting the negative electrode and the positive electrode by a lead wire, an electric energy can be taken out.

(Negative Electrode) $4Li \rightarrow 4Li^+ + 4e^-$
(Positive Electrode) $O_2 + 4e^- \rightarrow 2O^{2-}$
$4Li^+ + 2O^{2-} \rightarrow 2Li_2O$
$2Li^+ + 2O^{2-} \rightarrow Li_2O_2$ In the charge time, lithium ions and oxygen ions are formed from lithium oxide or lithium peroxide at the positive electrode as shown in the following formulae, and the formed lithium ions permeate through the electrolyte layer and migrate into the negative electrode. The formed oxygen ions are occluded or adsorbed as they are or as oxygen molecules formed by oxidation of the oxygen ions in or on the oxygen storage material. At the negative electrode, the lithium ions are reduced and deposit as metallic lithium.

(Positive Electrode) $2Li_2O \rightarrow 4Li^+ + 2O^{2-}$
$Li_2O_2 \rightarrow 2Li^+ + 2O^{2-}$
(Negative Electrode) $4Li^+ + 4e^- \rightarrow 4Li$ Here, the metal oxygen battery according to the present invention, the positive electrode comprises the oxygen storage material including a mixed crystal of a hexagonal composite metal oxide expressed by the general formula $A_xB_yO_z$ (wherein A is one type of metal selected from a group consisting of Y, Sc, La, Sr, Ba, Zr, Au, Ag, Pt, Pd, and B is one type of metal selected from a group consisting of Mn, Ti, Ru, Zr, Ni, Cr, and x=1, 1≤y≤2, 1≤z≤7, provided that a case where both A and B are Zr is excluded) and one or more non-hexagonal composite metal oxide expressed by the general formula $A_xB_yO_z$. Here, in the general formula $A_xB_yO_z$ expressing the hexagonal composite metal oxide and the general formula $A_xB_yO_z$ expressing the non-hexagonal composite metal oxide, each of the metal A and the metal B may be same or may be different. Moreover, each of the x, y, and z may be same or different.

In the oxygen storage material, since the hexagonal composite metal oxide acts both as the oxygen storage material and as a catalyst, there is a tendency that the action as the catalyst in the electrode reaction becomes insufficient. However, in the oxygen storage material, the hexagonal composite metal oxide forms a mixed crystal with one or more non-hexagonal composite metal oxide, and by the non-hexagonal composite metal oxide acting as a promoter, the electrode reaction is facilitated. Therefore, according to the metal oxygen battery of the present invention, it is able to decrease the overvoltage.

In the metal oxygen battery of the present invention, it is necessary that in the oxygen storage material a mixed crystal of the hexagonal composite metal oxide and the one or more non-hexagonal composite metal oxide is formed, and by only just being mixed, the effect of facilitating the electrode reaction cannot be sufficiently obtained.

Moreover, in the metal oxygen battery of the present invention, for example, $YMnO_3$ can be used as the hexagonal composite metal oxide. Here, for example, one or more type of composite metal oxide selected from a group consisting of an orthorhombic $YMnO_3$, orthorhombic $YMn_2O_5$, and tetragonal $Y_2Mn_2O_7$ ($YMnO_{3.5}$) can be used as the non-hexagonal composite metal oxide, Also in the metal oxygen battery of the present invention, the oxygen storage material includes metal oxide capable of insertion and desorption of the lithium ions, and it is preferable that the metal oxide is an oxide of the metal A or an oxide of the metal B.

In such case, since insertion of the lithium ions generated by the electrode reaction to the metal oxide or desorption from the metal oxide is possible, the electrode reaction is promoted, thereby increasing the battery capacity. Moreover, by the metal oxide being an oxide of the metal A or being an oxide of the metal B, in the mixed crystal composing the oxygen storage material, a more stable mixed crystal state can be formed.

In the metal oxygen battery of the present invention, the positive electrode, the negative electrode, and the electrolyte layer are preferably disposed in a hermetically sealed case. In the metal oxygen battery according to the present invention, the oxygen storage material can chemically occlude and release or physically adsorb and desorb oxygen. Therefore, in the metal oxygen battery according to the present invention, oxygen as an active material can be obtained at the positive electrode disposed in the hermetically sealed case instead of exposing the positive electrode to the atmosphere and forming a weak light transmission part, and there is no risk of the deterioration by moisture and carbon dioxide in the atmosphere and the leakage of an electrolyte solution by damage to the light transmission part.

Although in the case where the oxygen storage material occludes and releases oxygen, the formation and dissociation of a chemical bond with oxygen is involved, in the case where oxygen is adsorbed on and desorbed from its surface, only an intermolecular force acts, and no formation and dissociation of a chemical bond is involved.

Therefore, the adsorption and desorption of oxygen on and from the surface of the oxygen storage material is carried out with a lower energy compared to the case where the oxygen storage material occludes and releases oxygen, and oxygen adsorbed on the surface of the oxygen storage material is preferentially used in the battery reaction. Consequently, a decrease in the reaction rate and a rise in the overvoltage can be suppressed.

A method for manufacturing an oxygen storage material used for the metal oxygen battery of the present invention, is a method of manufacturing an oxygen storage material including a mixed crystal of a plurality of composite metal oxides expressed by a general formula $A_xB_yO_z$ (wherein A is one type of metal selected from a group consisting of Y, Sc, La, Sr, Ba, Zr, Au, Ag, Pt, Pd, and B is one type of metal selected from a group consisting of Mn, Ti, Ru, Zr, Ni, Cr, and x=1, 1≤y≤2, 1≤z≤7, provided that a case where both A and B are Zr is excluded), wherein each of a hexagonal composite metal oxide expressed by the general formula $A_xB_yO_z$ and one or more non-hexagonal composite metal oxide expressed by the general formula $A_xB_yO_z$ is pulverized and mixed, and a mixture obtained is calcined in a temperature range of 600 to 1200° C. for a time range of 1 to 10 hours to obtain a mixed crystal of the hexagonal composite metal oxide and the one or more non-hexagonal composite metal oxide.

In the manufacturing method of the present invention, the hexagonal composite metal oxide and the one or more non-hexagonal composite metal oxide are crushed and then mixed, and the obtained mixture of a plurality of composite metal oxides is calcined in the temperature range of 600 to 1200° C. for a time range of 1 to 10 hours. As a result, particles of the hexagonal composite metal oxide and particles of the one or more non-hexagonal composite metal oxide are bonded with each other, thereby enabling to obtain the mixed crystal of the hexagonal composite metal oxide and the one or more non-hexagonal composite metal oxide.

At this time, if the calcining temperature is less than 600° C. or the calcining time is less than 1 hour, the hexagonal composite metal oxide and the one or more non-hexagonal composite metal oxide are not bonded with each other while being calcined and the mixed crystal cannot be obtained. Moreover, if the calcining temperature exceeds 1200° C. or the calcining time exceeds 10 hours, the particles of the hexagonal composite metal oxide and the particles of the one or more non-hexagonal composite metal oxide melt while being calcined, and each particle is not able to maintain the original crystal structure. Therefore, the mixed crystal cannot be obtained.

DETAILED DESCRIPTION OF THE PREFERRED EMBODIMENTS

Next, embodiments according to the present invention will be described in more detail by reference to accompanying drawings.

Figure 1:
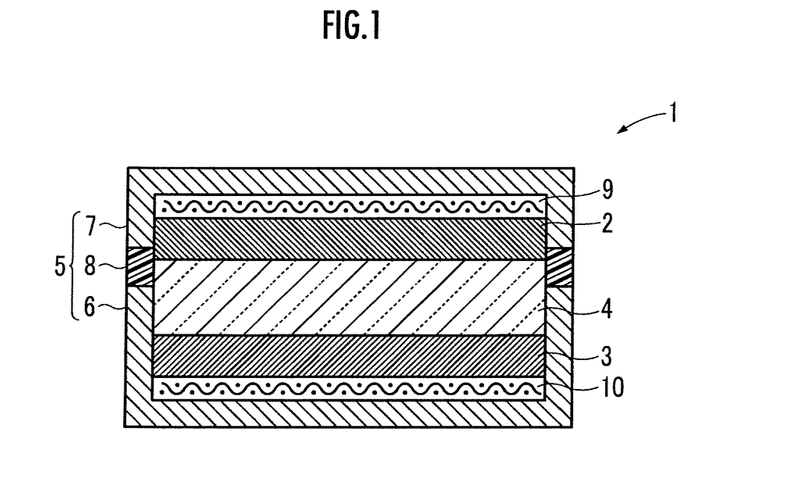
FIG. 1 is an illustrative cross-sectional diagram showing one constitution example of a metal oxygen battery according to the present invention.

As shown in FIG. 1, a metal oxygen battery 1 according to the present embodiment comprises a positive electrode 2 using oxygen as an active material, a negative electrode 3 using metallic lithium as an active material, and an electrolyte layer 4 disposed between the positive electrode 2 and the negative electrode 3, and the positive electrode 2, the negative electrode 3 and the electrolyte layer 4 are hermetically sealed and accommodated in a case 5.

The case 5 comprises a cup-shape case body 6, and a lid body 7 to close the case body 6, and an insulating resin 8 is interposed between the case body 6 and the lid body 7. The positive electrode 2 has a positive electrode current collector 9 between the top surface of the lid body 7 and the positive electrode 2, and a negative electrode 3 has a negative electrode current collector 10 between the bottom surface of the case body 6 and the negative electrode 3. Here, in the metal oxygen battery 1, the case body 6 acts as a negative electrode plate, and the lid body 7 acts as a positive electrode plate.

In the metal oxygen battery 1, the positive electrode 2 is composed of an oxygen storage material, a conductive material, and a binder.

The oxygen storage material includes a mixed crystal of a hexagonal composite metal oxide expressed by a general formula $A_xB_yO_z$ (wherein A is one type of metal selected from a group consisting of Y, Sc, La, Sr, Ba, Zr, Au, Ag, Pt, Pd, and B is one type of metal selected from a group consisting of Mn, Ti, Ru, Zr, Ni, Cr, and x=1, 1≤y≤2, 1≤z≤7, provided that a case where both A and B are Zr is excluded) and one or more non-hexagonal composite metal oxide expressed by the general formula $A_xB_yO_z$. Here, in the general formula $A_xB_yO_z$ expressing the hexagonal composite metal oxide and the general formula $A_xB_yO_z$ expressing the non-hexagonal composite metal oxide, each of the metal A and the metal B may be same or may be different. Moreover, each of the x, y, and z may be same or different.

As the hexagonal composite metal oxide, for example, $YMnO_3$ may be used. Moreover, as the non-hexagonal composite metal oxide, for example, one or more type of composite metal oxide selected from the group consisting of an orthorhombic $YMnO_3$, orthorhombic $YMn_2O_5$, and tetragonal $Y_2Mn_2O_7$ can be used.

The hexagonal composite metal oxide such as $YMnO_3$ or the like has a function of occluding or releasing oxygen, and can adsorb and desorb oxygen on/from the surface, and also acts as a catalyst in the electrode reaction of the positive electrode 2. Furthermore, all of the non-hexagonal composite metal oxides such as orthorhombic $YMnO_3$, orthorhombic $YMn_2O_5$, and the tetragonal $Y_2Mn_2O_7$, or the like forming the mixed crystal with the hexagonal composite metal oxide, act as a promoter of the hexagonal composite metal oxide in the electrode reaction of the positive electrode 2.

Moreover, the oxygen storage material may include metal oxide capable of insertion and desorption of lithium ions. The metal oxide is an oxide of the metal A or an oxide of the metal B. For example, in a case where $YMnO_3$ is used as the hexagonal composite metal oxide, $MnO$, $MnO_2$, or $Mn_2O_3$ or the like may be used as the metal oxide.

As the conductive material, for example, carbon materials such as graphite, acetylene black, Ketjen Black, carbon nanotubes, mesoporous carbon and carbon fibers, or the like may be used.

As the binder, for example, polytetrafluoroethylene (PTFE) and polyvinylidene fluoride (PVDF), or the like may be used.

As the negative electrode 3, any of the one using metallic lithium as an active material may be used, for example, metallic lithium, lithium alloy, lithium organic compound, lithium organic complex, and carbon, silicon, silicon alloy, aluminum, zinc, iron, and the like which are capable of inserting and desorbing lithium. Especially, metallic lithium is preferable for having high theoretical potential and electrochemical equivalent weight compared to a case in which other materials are used.

Next, the electrolyte layer 4, for example, may be the one in which a nonaqueous electrolyte solution is immersed in a separator, or may be a solid electrolyte. Moreover, in a case where the theoretical potential of the cell reaction of the metal oxygen battery 1 is less than 1.23V, electrolyte solution in which lithium salt is dissolved in water may be used as the electrolyte layer 4. As the lithium salt, for example, carbonate salt, nitrate salt, acetate salt, and the like can be used.

As the nonaqueous electrolyte solution, for example, one in which lithium salt is dissolved in a nonaqueous solvent may be used. The lithium salt includes, for example, carbonate salt, nitrate salt, acetate salt, and the like. The nonaqueous solvent includes, for example, carbonate esteric solvents, etheric solvents, ionic liquids, and the like.

The carbonate esteric solvent includes, for example, ethylene carbonate, propylene carbonate, dimethyl carbonate, diethyl carbonate, and the like. The carbonate esteric solvent may be used as a mixture of two or more.

The etheric solvent includes, for example, dimethoxyethane, dimethyltriglyme and polyethylene glycol or the like. The etheric solvent may be used as a mixture of two or more.

The ionic liquid includes, for example, salts of cations such as imidazolium, ammonium, piperidinium, and the like, with anions such as bis (trifluoromethylsulfonyl) imide (TTSI), bis (pentafluoroethylsulfonyl) imide (BETI), tetrafluoroborates, perchlorates, halogen anions, and the like.

The separator includes, for example, glass fibers, glass papers, polypropylene nonwoven fabrics, polyimide nonwoven fabrics, polyphenylene sulfide nonwoven fabrics, teflon nonwoven fabrics, polyethylene porous films and the like. As the separator, for example, a one having a thickness of 40 to 1000 μm may be used.

The solid electrolyte includes, for example, oxide-based solid electrolyte and sulfide-based solid electrolyte, and the like.

The oxide-based solid electrolyte includes, for example, $Li_7La_3Zr_2O_{12}$, which is a composite oxide of lithium, lanthanum and zirconium, and glass ceramics containing lithium, aluminum, silicon, titanium, germanium and phosphorus as main components. The $Li_7La_3Zr_2O_{12}$ may be one in which another metal such as strontium, barium, silver, yttrium, bismuth, lead, tin, antimony, hafnium, tantalum and niobium is substituted for a part of each of lithium, lanthanum and zirconium.

An interfacial layer (not illustrated) which is a reformed electrolyte layer 4, may be provided between the negative electrode 3 and the electrolyte layer 4.

Then, the current collectors 9 and 10 includes ones composed of meshes of titanium, stainless steel, nickel, aluminum, copper, or the like.

In the metal oxygen battery 1 according to the present embodiment, in the discharge time, metallic lithium is oxidized to form lithium ions and electrons at the negative electrode 3 as shown in the following formula. The formed lithium ions migrate into the positive electrode 2, and react with oxygen ions formed by reduction of oxygen supplied from the oxygen storage material to form lithium oxide or lithium peroxide.

(Negative Electrode) $4Li \rightarrow 4Li^+ + 4e^-$
(Positive Electrode) $O_2 + 4e^- \rightarrow 2O^{2-}$
$4Li^+ + 2O^{2-} \rightarrow 2Li_2O$
$2Li^+ + 2O^{2-} \rightarrow Li_2O_2$ On the other hand, in the charge time, lithium ions and oxygen ions are formed from lithium oxide or lithium peroxide at the positive electrode 2 as shown in the following formulae. The formed lithium ions migrate into the negative electrode 3 and are reduced at the negative electrode 3 to thereby deposit as metallic lithium.

(Positive Electrode) $2Li_2O \rightarrow 4Li^+ + 2O^{2-}$
$Li_2O_2 \rightarrow 2Li^+ + 2O^{2-}$
(Negative Electrode) $4Li^+ + 4e^- \rightarrow 4Li$ At this time, at the positive electrode 2, since the oxygen storage material contains mixed crystal, the hexagonal composite metal oxide acts as the catalyst in the electrode reaction, and the non-hexagonal composite metal oxide acts as the promoter. Therefore, according to the metal oxygen battery 1, the electrode reaction is promoted compared to a case where only the hexagonal composite metal oxide acts as the catalyst, and thereby enables to decrease the overvoltage.

Moreover, the hexagonal composite metal oxide included in the oxygen storage material has the function to occlude or release oxygen, and also can adsorb or desorb oxygen to or from its surface. The hexagonal composite metal oxide accompanies formation or dissociation of chemical bond to occlude or release oxygen at the time of discharging or charging, however, the adsorb or desorb of oxygen to or from its surface can be done only by the energy that corresponds to intermolecular force. Therefore, the oxygen adsorbed or desorbed at the surface of the oxygen storage material is preferentially used in the cell reaction at the positive electrode 2, which enables to suppress the decrease of reaction rats and rise of overvoltage.

Moreover, in the positive electrode 2, when the oxygen storage material includes metal oxide (oxide of the metal A or oxide of the metal B) in addition to the mixed crystal, by the insertion to the metal oxide or the desorption from the metal oxide of the lithium ions generated by the electrode reaction, the electrode reaction is promoted. As a result, it is able to increase the battery capacity.

Next, the manufacturing method of the oxygen storage material is explained.

First, hexagonal composite metal oxide and non-hexagonal composite metal oxide are provided. Then, compound including metal A, compound including metal B, and organic acid are mixed so as to become a predetermined molar ratio. Thereafter, pure water is added, and by crushing and mixing them using a rotary type ball mill, a mixture of each composite metal oxide material is obtained. Next, the obtained mixture of the composite metal oxide material is primarily calcined and the obtained primarily calcined product is pulverized and mixed. Thereafter, by further conducting secondary calcining, the intended composite metal oxide is obtained, respectively.

In a cases where the composite metal oxide is hexagonal $YMnO_3$, first, yttrium nitrate pentahydrate, manganese nitrate hexahydrate and malic acid are mixed in a molar ratio of 1:1:6. Next, the obtained mixture of composite metal oxide material is primarily calcined at a temperature range of 250 to 400° C. for 3 hours. Thereafter, the obtained primarily calcined product is pulverized and mixed, and then further treated under secondary calcining in the temperature range of 850 to 1200° C. for 1 hour, thereby to obtain the hexagonal $YMnO_3$.

In a case where the composite metal oxide is orthorhombic $YMnO_3$, first, yttrium nitrate pentahydrate, manganese nitrate hexahydrate and malic acid are mixed in a molar ratio of 1:1:6. Next, the obtained mixture of composite metal oxide material is primarily calcined at a temperature range of 200 to 400° C. for 3 hours. Thereafter, the obtained primarily calcined product is pulverized and mixed, and then further treated under secondary calcining in the temperature range of 600 to 860° C. for 1 hour, thereby to obtain the orthorhombic $YMnO_3$.

In a case where the composite metal oxide is orthorhombic $YMn_2O_5$, first, yttrium nitrate pentahydrate, manganese nitrate hexahydrate and malic acid are mixed in a molar ratio of 1:2:6. Next, the obtained mixture of composite metal oxide material is primarily calcined at a temperature range of 200 to 400° C. for 3 hours. Thereafter, the obtained primarily calcined product is pulverized and mixed, and then further treated under secondary calcining in the temperature range of 600 to 1000° C. for 1 hour, thereby to obtain the orthorhombic $YMn_2O_5$.

In a case where the composite metal oxide is tetragonal $Y_2Mn_2O_7$, first, yttrium nitrate pentahydrate, manganese nitrate hexahydrate, and malic acid are mixed in a molar ratio of 2:2:6. Next, the obtained mixture of composite metal oxide material is primarily calcined at a temperature range of 200 to 400° C. for 3 hours. Thereafter, the obtained primarily calcined product is pulverized and mixed, and then further treated under secondary calcining in the temperature range of 1000 to 1200° C. for 10 hours, thereby to obtain the tetragonal $Y_2Mn_2O_7$.

Next, the obtained hexagonal composite metal oxide (for example, $YMnO_3$) and the non-hexagonal composite metal oxide (for example, orthorhombic $YMnO_3$, orthorhombic $YMn_2O_5$, and the tetragonal $Y_2Mn_2O_7$,) are mixed, pure water is added, and then crushed and mixed by using a rotary type ball mill. The crushing by the rotary type ball mill is conducted at a revolution speed of 100 to 1000 rpm for 0.5 to 10 hours. By doing so, it is able to bring into close contact, the particles of the hexagonal composite metal oxide and the particles of the one or more non-hexagonal composite metal oxide.

Next, the obtained mixture of the hexagonal composite metal oxide and the non-hexagonal composite metal oxide is calcined in a temperature range of 600 to 1200° C. for 1 to 10 hours. In association with the calcining, the particles of the hexagonal composite metal oxide and the particles of the one or more non-hexagonal composite metal oxide are bonded to each other, and it is able to obtain a mixed crystal of the hexagonal composite metal oxide and the one or more non-hexagonal composite metal oxide.

At this time, the particle of the hexagonal composite metal oxide and the particles of the non-hexagonal composite metal oxide do not bond to each other when being calcined at a calcining temperature lower than 600° C. or the calcining time being less than 1 hour, and thereby the mixed crystal cannot be obtained. Moreover, if the calcining temperature exceeds 1200° C. or the calcining time exceeds 10 hours, the particles of the hexagonal composite metal oxide and the particles of the non-hexagonal composite metal oxide dissolve while being calcined, and each of the particles cannot maintain the original crystal structure. Thereby the mixed crystal cannot be obtained.

Next, Examples and Comparative Examples are shown.

EMBODIMENTS

Example 1

In the present example, first, yttrium nitrate pentahydrate, manganese nitrate hexahydrate, and malic acid were mixed in a molar ratio of 1:1:6. Then, pure water was added, and crushed and mixed at 500 rpm using a rotary type ball mill for 1 hour to obtain a mixture of a composite metal oxide material. Next, the obtained mixture of the composite metal oxide material was reacted at a temperature of 250° C. for 30 min, and thereafter further reacted at a temperature of 300° C. for 30 min, and then at a temperature of 350° C. for 1 hour. Then, the mixture of the reaction product was crushed and mixed, and thereafter calcined at a temperature of 1,000° C. for 1 hour to thereby obtain a hexagonal $YMnO_3$ as the composite metal oxide.

Next, orthorhombic $YMnO_3$ as the composite metal oxide was obtained in the same way as in the case of the hexagonal $YMnO_3$ except for calcining the mixture of the reaction product after crushing and mixing at a temperature of 1,000° C. for 1 hour.

Then, orthorhombic $YMn_2O_5$ as the composite metal oxide was obtained in the same way as in the case of the hexagonal $YMnO_3$ except that the molar ratio of yttrium nitrate pentahydrate, manganese nitrate hexahydrate, and malic acid was 1:2:6, and except for calcining the mixture of the reaction product after crushing and mixing at a temperature of 1,000° C. for 1 hour.

Then, tetragonal $Y_2Mn_2O_7$, as the composite metal oxide was obtained in the same way as in the case of the hexagonal $YMnO_3$ except that the molar ratio of yttrium nitrate pentahydrate, manganese nitrate hexahydrate, and malic acid was 2:2:6, and except for calcining the mixture of the reaction product after crushing and mixing at a temperature of 1,000° C. for 1 hour.

Then, the obtained hexagonal $YMnO_3$, orthorhombic $YMnO_3$, orthorhombic $YMn_2O_5$, and the tetragonal $Y_2Mn_2O_7$ was mixed, and an appropriate amount of pure water was added, and then crushed and mixed for 10 hours by using a rotary type ball mill at a rotational rate of 100 rpm, thereby to obtain a mixture of hexagonal composite metal oxide and non-hexagonal composite metal oxide.

Then, the obtained mixture of a plurality of composite metal oxides was calcined at a temperature of 1000° C. for 10 hours, thereby to obtain a sintered body composed of hexagonal composite metal oxide and non-hexagonal composite metal oxide. The sintered body was used as the oxygen storage material.

Figure 2A:
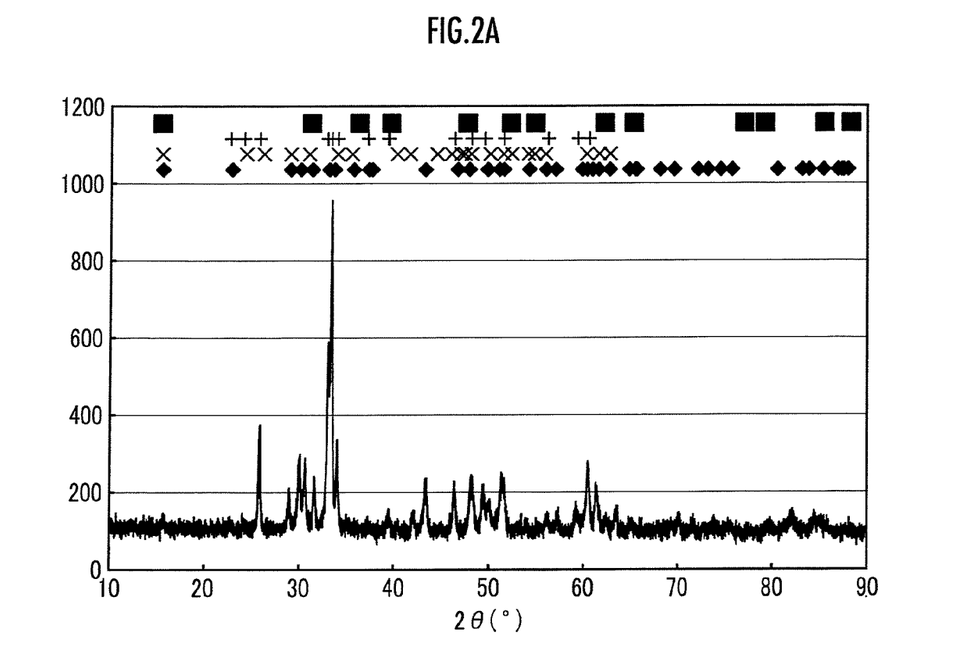
FIG. 2A is a graph showing X-ray diffraction pattern of an oxygen storage material of Example 1 used for a positive electrode of the present invention.

Then, the X-ray diffraction pattern of the obtained oxygen storage material was measured by a X-ray diffraction apparatus (made by Bruker AXS K.K.). The measuring condition was tube voltage 50 kV, tube current 150 mA, diffractometer 4°/min, measurement range (2θ) in the range of 10 to 90°. The result is shown in FIG. 2A. In FIG. 2A, the mark ♦ indicates a peak of hexagonal $YMnO_3$, the mark + indicates a peak of orthorhombic $YMnO_3$, the mark × indicates a peak of orthorhombic $YMn_2O_5$, and the mark ■ indicates a peak of tetragonal $Y_2Mn_2O_7$.

From FIG. 2A, it is clear that in the oxygen storage material obtained in the present example, the hexagonal $YMnO_3$, the orthorhombic $YMnO_3$, the orthorhombic $YMn_2O_5$, and the tetragonal $Y_2Mn_2O_7$ had formed a mixed crystal.

Next, the sintered body as the oxygen storage material, Ketjen Black (made by Lion Corp.) as a conductive material, and a polytetrafluoroethylene (made by Daikin Industries, Ltd.) as a binder were mixed in a mass ratio of 80:10:10 to thereby obtain a positive electrode mixture. Then, the obtained positive electrode mixture was press bonded at a pressure of 5 MPa on a positive electrode current collector 9 composed of an Al mesh to thereby form a positive electrode 2 of 15 mm in diameter and 1 mm in thickness.

Then, a negative electrode current collector 10 of 15 mm in diameter composed of a SUS mesh was arranged inside a bottomed cylindrical SUS-made case body 6 of 15 mm in inner diameter, and a negative electrode 3 of 15 mm in diameter and 0.1 mm in thickness composed of metallic lithium was superposed on the negative electrode current collector 10.

Then, a separator of 15 mm in diameter composed of a glass fiber (made by Nippon Sheet Glass Co., Ltd.) was superposed on the negative electrode 3. Then, the positive electrode 2 and the positive electrode current collector 9 obtained as described above were superposed on the separator so that the positive electrode 2 contacted with the separator. Then, a nonaqueous electrolyte solution was injected in the separator to thereby form the electrolyte layer 4.

As the nonaqueous electrolyte solution, a solution (made by Kishida Chemical Co., Ltd.) in which lithium hexafluorophosphate ($LiPF_6$) as a supporting salt was dissolved in a concentration of 1 mol/L in a mixed solution prepared by mixing ethylene carbonate and diethyl carbonate in a mass ratio of 70:30, was used.

Then, a laminate comprising the negative electrode current collector 10, the negative electrode 3, the electrolyte layer 4, the positive electrode 2, and the positive electrode current collector 9 accommodated in the case body 6 was closed by a bottomed cylindrical SUS-made lid body 7 of 15 mm in inner diameter. At this time, a ring-shape insulating resin 8 of 32 mm in outer diameter, 30 mm in inner diameter and 5 mm in thickness composed of a polytetrafluoroethylene (PTFE) was disposed between the case body 6 and the lid body 7 to thereby obtain the metal oxygen battery 1 shown in FIG. 1.

Figure 3:
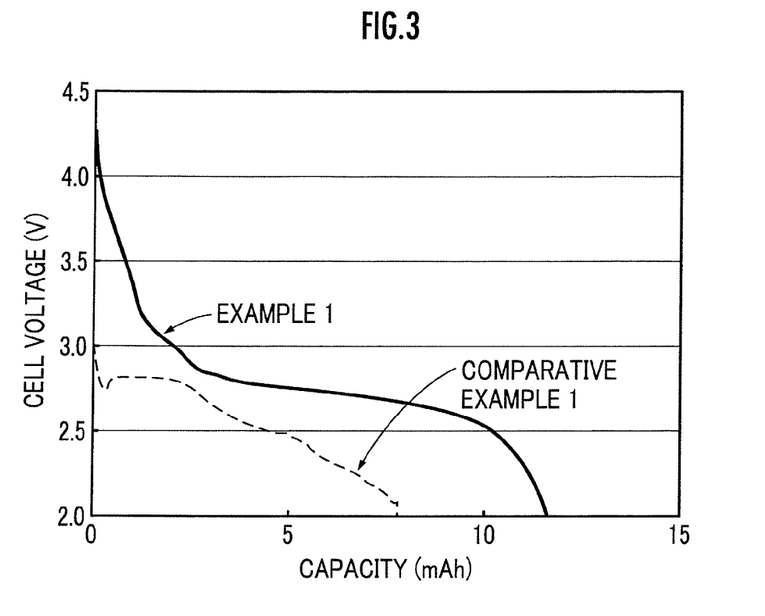
FIG. 3 is a graph showing a discharge curve in a metal oxygen battery of Example 1.
Figure 4:
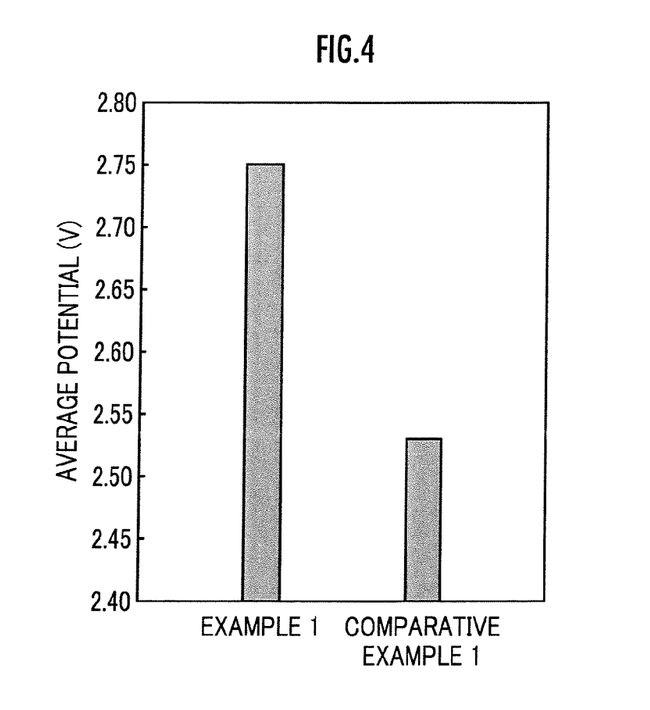
FIG. 4 is a graph showing an average potential of the metal oxygen battery of Example 1.

Then, the metal oxygen battery 1 obtained in the present example was loaded on an electrochemical measuring apparatus (made by Toho Technical Research Co., Ltd.), and a current of 0.1 mA/cm$^2$ was applied between the negative electrode 3 and the positive electrode 2, and the discharge was carried out until the cell voltage became 2.0 V. The relationship between the cell voltage and the discharge capacity at this time is shown in FIG. 3. Also, the average potential at this time is shown in FIG. 4.

Comparative Example 1

In the present comparative example, hexagonal $YMnO_3$, orthorhombic $YMnO_3$, orthorhombic $YMn_2O_5$, and tetragonal $Y_2Mn_2O_7$ were obtained wholly the same as Example 1.

Next, the obtained hexagonal $YMnO_3$, orthorhombic $YMnO_3$, orthorhombic $YMn_2O_5$, and the tetragonal $Y_2Mn_2O_7$ were mixed in a mortar to obtain a mixture including hexagonal composite metal oxide and non-hexagonal composite metal oxide. The mixture was used as the oxygen storage material. Here, by conducting the mixing in a mortar, it is able to obtain the mixture without forming a mixed crystal of the hexagonal composite metal oxygen and the non-hexagonal composite metal oxygen.

Then, the X-ray diffraction pattern of the obtained oxygen storage material was measured wholly the same as Example 1. The result is shown in FIG. 2B.

Figure 2B:
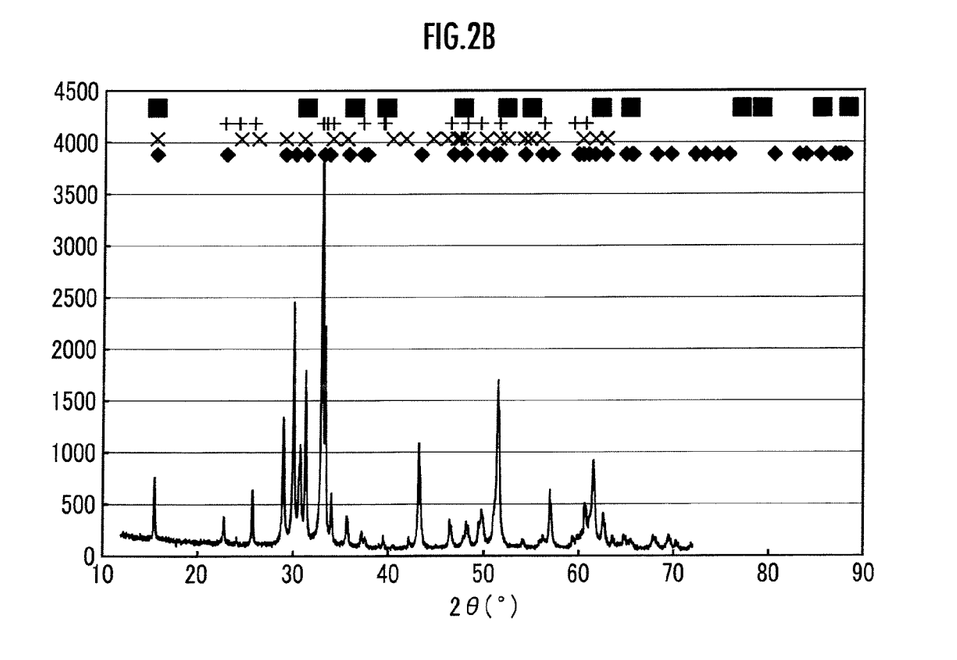
FIG. 2B is a graph showing X-ray diffraction pattern of an oxygen storage material of Comparative Example 1.

From FIG. 2B, it is clear that in the oxygen storage material obtained in the present comparative example, the hexagonal $YMnO_3$, the orthorhombic $YMnO_3$, the orthorhombic $YMn_2O_5$, and the tetragonal $Y_2Mn_2O_7$ are only being mixed, and do not form a mixed crystal.

Next, a metal oxygen battery 1 was obtained wholly the same as Example 1 except that the oxygen storage material obtained by the present comparative example was used.

Then, discharging was conducted wholly the same as Example 1 except that the metal oxygen battery 1 obtained in the present comparative example was used. The relationship between the cell voltage and the discharge capacity at this time is shown in FIG. 3. Also, the average potential at this time is shown in FIG. 4.

From FIG. 3, the metal oxygen battery 1 of Example 1 using the oxygen storage material composed of mixed crystal of hexagonal $YMnO_3$, the orthorhombic $YMnO_3$, the orthorhombic $YMn_2O_5$, and the tetragonal $Y_2Mn_2O_7$ has larger discharge capacity compared to the metal oxygen battery 1 of Comparative Example 1 which uses oxygen storage material composed of a mixture of these composite metal oxides, and therefore, it is clear that the overvoltage is lower in Example 1.

Moreover, from FIG. 4, according to the metal oxygen battery 1 of Example 1, it is clear that the average potential is higher than the metal oxygen battery of Comparative Example 1.

Example 2

In the present example, a sintered body composed of mixed crystal of hexagonal composite metal oxide (hexagonal $YMnO_3$) and non-hexagonal composite metal oxide (orthorhombic $YMnO_3$, the orthorhombic $YMn_2O_5$, and tetragonal $Y_2Mn_2O_7$) was obtained wholly the same as Example 1.

Next, the obtained sintered body and $MnO_2$ were mixed in a mass ratio of 70:10, and the obtained mixture was used as the oxygen storage material. The $MnO_2$ is a metal oxide which can insert and desorb lithium ions in an electrode reaction.

Then, a metal oxygen battery 1 was obtained wholly the same as Example 1 except the mixture of the sintered body and $MnO_2$ was used as the oxygen storage material.

Figure 5:
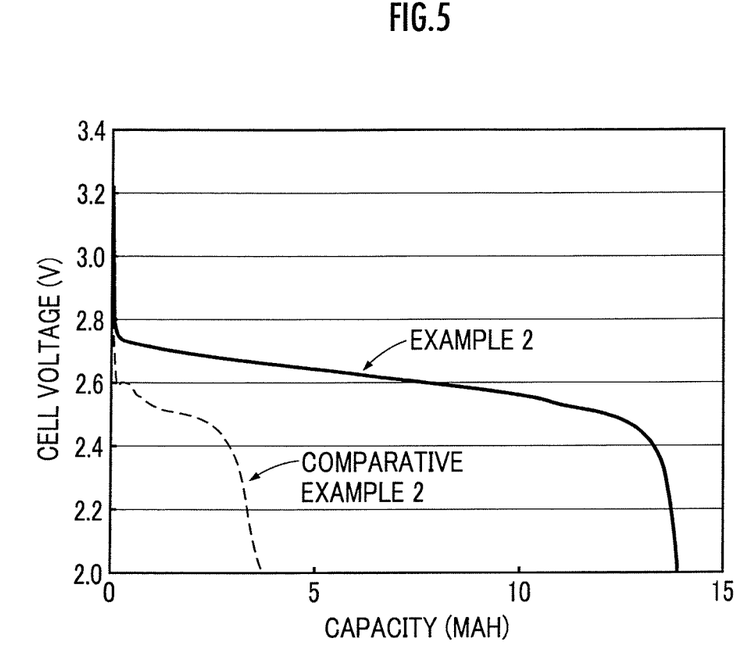
FIG. 5 is a graph showing a discharge curve in a metal oxygen battery of Example 2.
Figure 6:
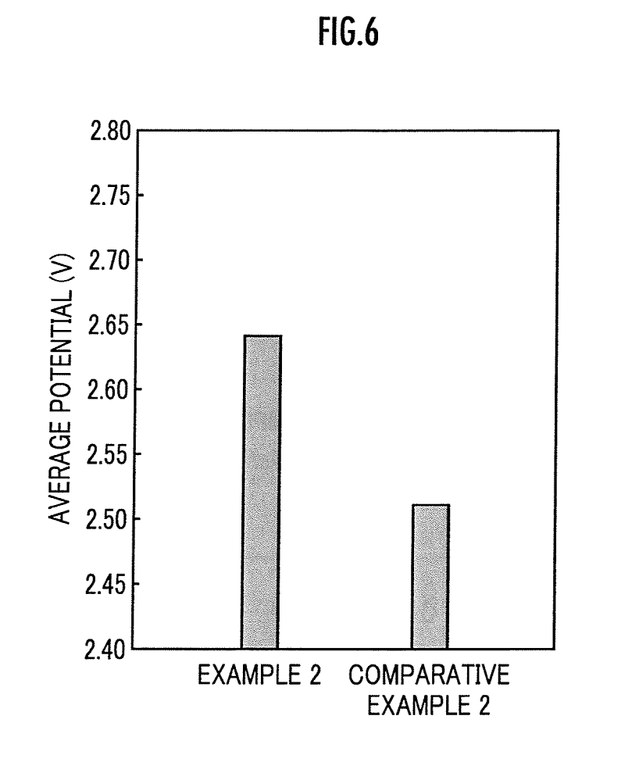
FIG. 6 is a graph showing an average potential of the metal oxygen battery of Example 2.

Then, discharging was conducted wholly the same as Example 1 except that the metal oxygen battery 1 obtained in the present example was used. The relationship between the cell voltage and the discharge capacity at this time is shown in FIG. 5. Also, the average potential at this time is shown in FIG. 6.

Comparative Example 2

In the present comparative example, a mixture including hexagonal composite metal oxide (hexagonal $YMnO_3$) and non-hexagonal composite metal oxide (orthorhombic $YMnO_3$, the orthorhombic $YMn_2O_5$, and tetragonal $Y_2Mn_2O_7$) was obtained wholly the same as Comparative Example 1.

Next, the obtained plurality of composite metal oxides and $MnO_2$ were mixed in a mass ratio of 70:10, and the obtained mixture was used as the oxygen storage material.

Then, a metal oxygen battery 1 was obtained wholly the same as Comparative Example 1 except the mixture of the plurality of composite metal oxides and $MnO_2$ was used as the oxygen storage material.

Then, discharging was conducted wholly the same as Comparative Example 1 except that the metal oxygen battery 1 obtained in the present comparative example was used. The relationship between the cell voltage and the discharge capacity at this time is shown in FIG. 5. Also, the average potential at this time is shown in FIG. 6.

From FIG. 5, the metal oxygen battery 1 of Example 2 using the oxygen storage material including $MnO_2$ in addition to the mixed crystal of hexagonal $YMnO_3$, the orthorhombic $YMnO_3$, the orthorhombic $YMn_2O_5$, and the tetragonal $Y_2Mn_2O_7$, has larger discharge capacity compared to the metal oxygen battery 1 of Comparative Example 2 which uses oxygen storage material including $MnO_2$ in addition to the mixture of these composite metal oxides, and therefore, it is clear that the overvoltage is lower in Example 2.

Moreover, from FIG. 6, according to the metal oxygen battery 1 of Example 2, it is clear that the average potential is higher compared to the metal oxygen battery of Comparative Example 2.

Furthermore, from FIG. 3 and FIG. 5, according to the metal oxygen battery 1 of Example 2 using the oxygen storage material including $MnO_2$ in addition to the mixed crystal, it is clear that the discharge capacity is larger compared to the metal oxygen battery 1 of Example 1 which is composed only from the mixed crystal and does not include $MnO_2$.

Example 3

In the present example, a mixture including hexagonal composite metal oxide and non-hexagonal composite metal oxide was obtained wholly the same as Example 1, except that the hexagonal $YMnO_3$ and orthorhombic $YMn_2O_5$ were mixed.

Next, a sintered body composed of hexagonal composite metal oxide and non-hexagonal composite metal oxide was obtained wholly the same as Example 1 except that the obtained mixture of plurality of composite metal oxides was used.

Then, the X-ray diffraction pattern of the sintered body obtained in the present example was measured wholly the same as Example 1. It was found that the hexagonal YMnO$_3$ and orthorhombic YMn$_2$O$_5$ had formed a mixed crystal.

Then, MnO$_2$ was mixed wholly the same as Example 2 except that the sintered body obtained in the present example was used, and the obtained mixture was used as the oxygen storage material.

Then, metal oxygen battery 1 was obtained wholly the same as Example 2 except that the mixture of the sintered body and MnO$_2$ was used as the oxygen storage material.

Figure 7:
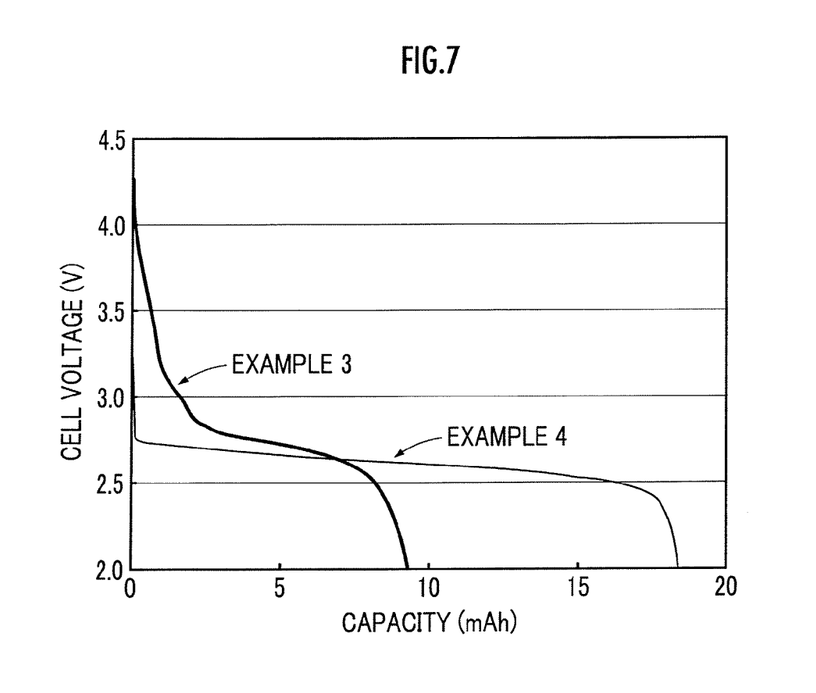
FIG. 7 is a graph showing a discharge curve in a metal oxygen battery of Example 3 and Example 4.
Figure 8:
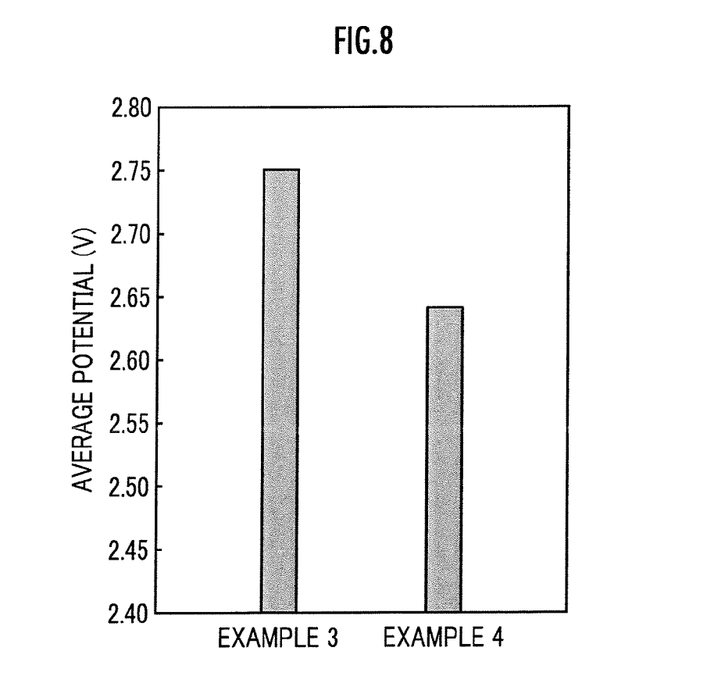
FIG. 8 is a graph showing an average potential of the metal oxygen battery of Example 3 and Example 4.

Then, discharging was conducted wholly the same as Example 2 except that the metal oxygen battery 1 obtained in the present example was used. The relationship between the cell voltage and the discharge capacity at this time is shown in FIG. 7. Also, the average potential at this time is shown in FIG. 8.

Example 4

In the present example, first, a mixture including hexagonal composite metal oxide and non-hexagonal composite metal oxide was obtained wholly the same as Example 1, except that hexagonal YMnO$_3$, orthorhombic YMnO$_3$, and orthorhombic YMn$_2$O$_5$ were mixed.

Next, a sintered body composed of hexagonal composite metal oxide and non-hexagonal composite metal oxide was obtained wholly the same as Example 1 except that the obtained mixture of plurality of composite metal oxides was used.

Then, the X-ray diffraction pattern of the sintered body obtained in the present example was measured wholly the same as Example 1. It was found that the hexagonal YMnO$_3$, orthorhombic YMnO$_3$, and the orthorhombic YMn$_2$O$_5$ had formed a mixed crystal.

Then, MnO$_2$ was mixed wholly the same as Example 2 except that the sintered body obtained in the present example was used, and the obtained mixture was used as the oxygen storage material.

Then, metal oxygen battery 1 was obtained wholly the same as Example 2 except that the mixture of the sintered body and MnO$_2$ was used as the oxygen storage material.

Then, discharging was conducted wholly the same as Example 2 except that the metal oxygen battery 1 obtained in the present example was used. The relationship between the cell voltage and the discharge capacity at this time is shown in FIG. 7. Also, the average potential at this time is shown in FIG. 8.

In the metal oxygen battery of Example 3, the positive electrode 2 comprises oxygen storage material including MnO$_2$ in addition to the mixed crystal of hexagonal YMnO$_3$ and orthorhombic YMn$_2$O$_5$. In the metal oxygen battery of Example 4, the positive electrode 2 comprises oxygen storage material including MnO$_2$ in addition to the mixed crystal of hexagonal YMnO$_3$, orthorhombic YMnO$_3$, and orthorhombic YMn$_2$O$_5$.

From FIG. 7 and FIG. 8, it is clear that the metal oxygen battery 1 of both Example 3 and Example 4 has large discharge capacity and has high average potential.

EXPLANATION OF THE REFERENCE SIGNS

1 . . . metal oxygen battery, 2 . . . positive electrode, 3 . . . negative electrode, 4 . . . electrolyte layer, 5 . . . case

What is claimed is:

1. A metal oxygen battery, comprising:
   a positive electrode to which oxygen is applied as an active material;
   a negative electrode to which metallic lithium is applied as an active material; and
   an electrolyte layer interposed between the positive electrode and the negative electrode,
   wherein the positive electrode contains oxygen storage material including
   a mixed crystal of:
   hexagonal composite metal oxide expressed by a general formula $A_xB_yO_z$ wherein, A is one type of metal selected from a group consisting of Y, Sc, La, Sr, Ba, Zr, Au, Ag, Pt, Pd, and B is one type of metal selected from a group consisting of Mn, Ti, Ru, Zr, Ni, Cr, and x=1, 1≤y≤2, 1≤z≤7, provided that a case where both A and B are Zr is excluded, and
   one or more non-hexagonal composite metal oxide expressed by the general formula $A_xB_yO_z$, wherein the hexagonal composite metal oxide is bonded to the one or more non-hexagonal composite metal.

2. The metal oxygen battery according to claim 1, wherein the hexagonal composite metal oxide is YMnO$_3$, and the non-hexagonal composite metal oxide is one or more type of composite metal oxide selected from a group consisting of orthorhombic YMnO$_3$, orthorhombic YMn$_2$O$_5$, and tetragonal Y$_2$Mn$_2$O$_7$.

3. The metal oxygen battery according to claim 1, wherein the oxygen storage material includes metal oxide capable of insertion and desorption of lithium ions, and the metal oxide is an oxide of the metal A or an oxide of the metal B.

4. The metal oxygen battery according to claim 1, wherein the positive electrode, the negative electrode, and the electrolyte layer are disposed in a hermetically sealed case.

5. A method for manufacturing an oxygen storage material including mixed crystal of a plurality of composite metal oxides expressed by a general formula $A_xB_yO_z$, wherein A is one type of metal selected from a group consisting of Y, Sc, La, Sr, Ba, Zr, Au, Ag, Pt, Pd, and
   B is one type of metal selected from a group consisting of Mn, Ti, Ru, Zr, Ni, Cr, and x=1, x=1, 1≤y≤2, 1≤z≤7, provided that a case where both A and B are Zr is excluded,
   wherein each of a hexagonal composite metal oxide expressed by the general formula $A_xB_yO_z$ and one or more non-hexagonal composite metal oxide expressed by the general formula $A_xB_yO_z$ is pulverized and mixed, and a mixture obtained is calcined in a temperature range of 600 to 1200° C. for a time range of 1 to 10 hours to obtain a mixed crystal of the hexagonal composite metal oxide and the one or more non-hexagonal composite metal oxide,
   wherein the hexagonal composite metal oxide is bonded to the one or more non-hexagonal composite metal oxides.

* * * * *